United States Patent [19]

Ross, Jr.

[11] 3,772,482

[45] Nov. 13, 1973

[54] MULTIPLE TROLLEY CONDUCTOR UNIT

[75] Inventor: Donald R. Ross, Jr., Bridgeville, Pa.

[73] Assignee: U-S Safety Trolley Corp., Pittsburgh, Pa.

[22] Filed: Mar. 4, 1971

[21] Appl. No.: 120,821

[52] U.S. Cl. .................................................. 191/23
[51] Int. Cl. ............................................. H02g 5/04
[58] Field of Search ................... 248/228; 339/22 T; 174/40, 43, 73, 75, 95, 97, 98; 191/33, 23 A, 44.1, 46, 30, 35, 29; 104/107, 106, 111, 89, 94, 123

[56] References Cited
UNITED STATES PATENTS

| 3,590,173 | 6/1971 | Stahmer | 191/35 |
| 3,546,367 | 12/1970 | Hart | 191/23 |
| 3,053,355 | 9/1962 | Attwood | 248/228 |
| 2,617,849 | 11/1952 | Wright | 339/22 T |
| 3,559,148 | 1/1971 | Hafer | 339/22 T |
| 445,841 | 2/1891 | Short | 191/44.1 |
| 2,863,009 | 12/1958 | Robinson | 191/23 A |

Primary Examiner—Gerald M. Forlenza
Assistant Examiner—D. W. Kern
Attorney—Brown, Murray, Flick & Peckham

[57] ABSTRACT

A rigid rail formed of insulating material has a front side provided with parallel slots extending lengthwise thereof for receiving current pick-up members movable lengthwise of the rail. The opposite side walls of each slot are provided at their inner sides with a pair of exposed grooves extending lengthwise thereof. A rigid electrical conductor bar is mounted in each slot with its edges retained in a pair of grooves therein, whereby the bars are spaced inwardly of the open sides of the slots to avoid accidental contact with them.

3 Claims, 7 Drawing Figures

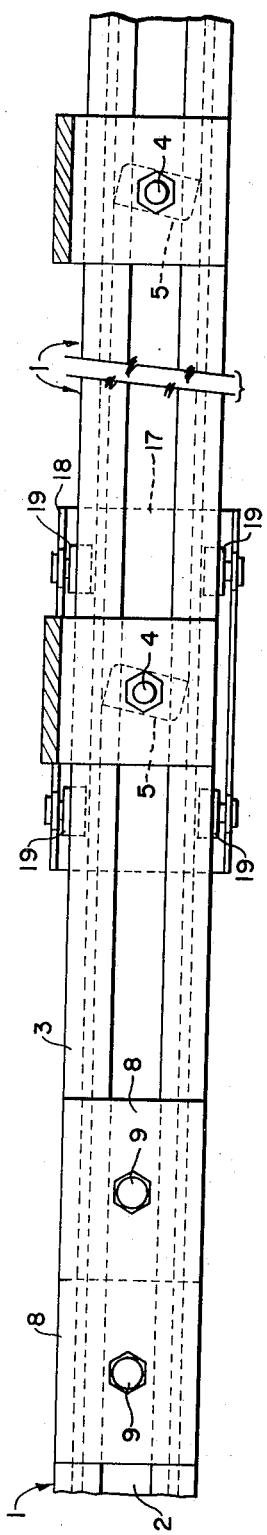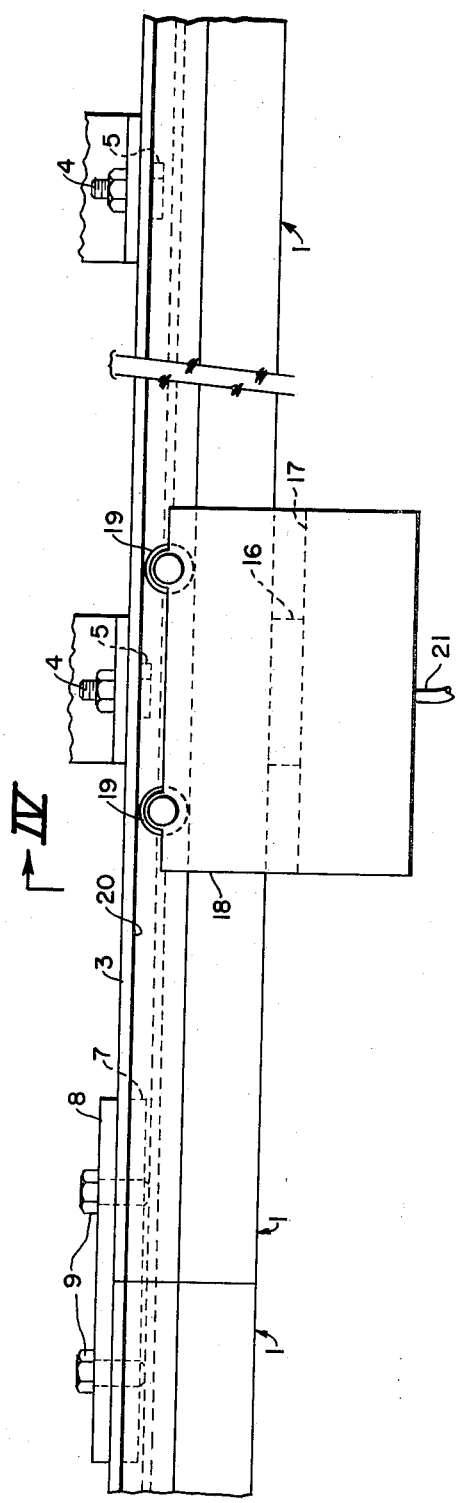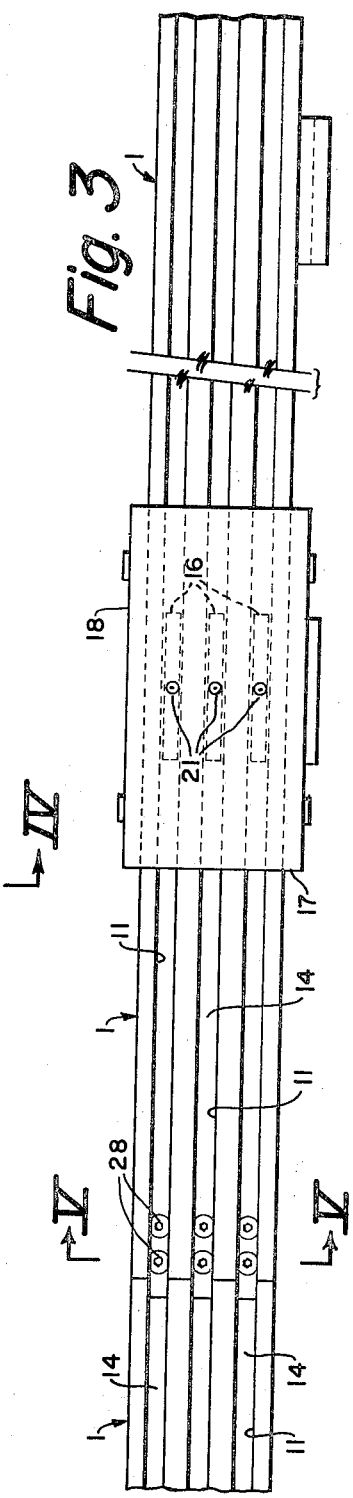
INVENTOR
DONALD R. ROSS, JR.
BY *Brown, Murray, Flick and Peckham*
ATTORNEYS

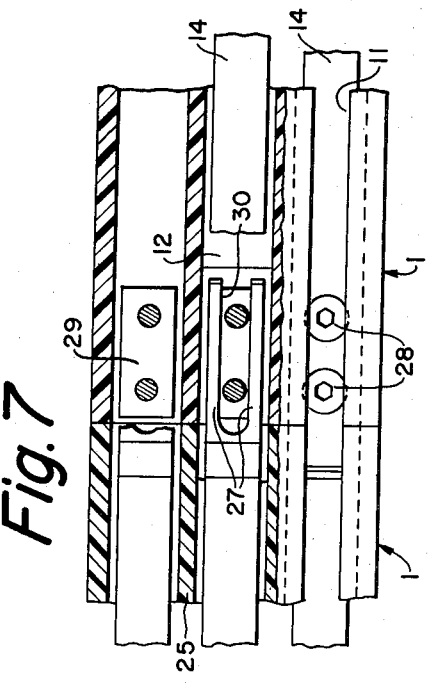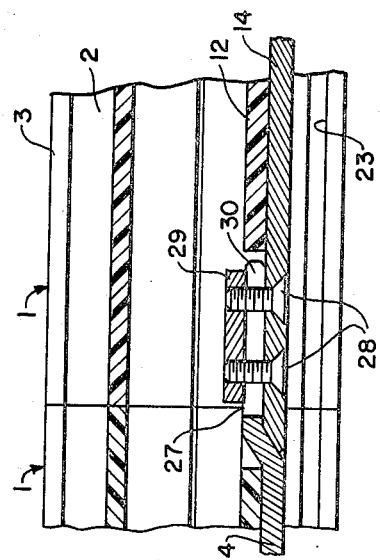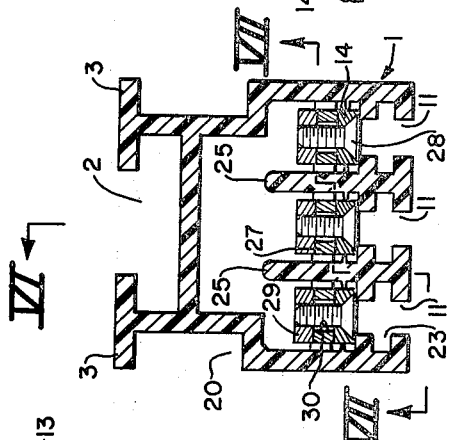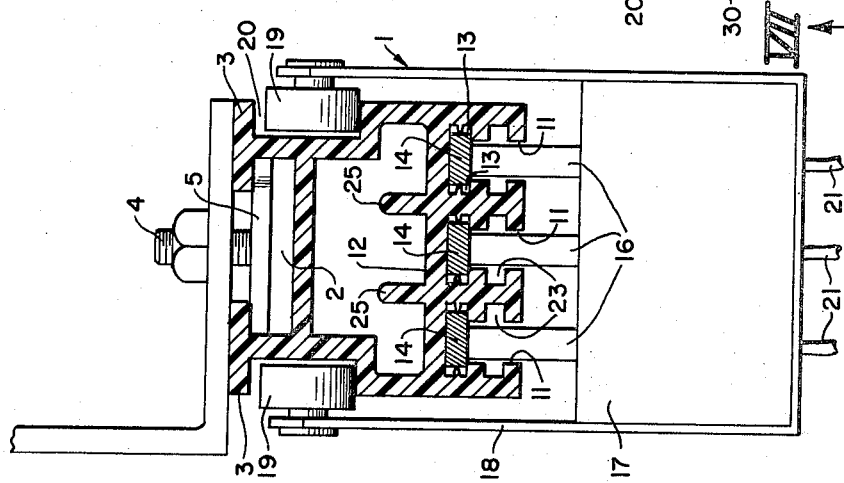

MULTIPLE TROLLEY CONDUCTOR UNIT

Electrical conductors, such as trolley wires or bars, are used in industrial plants to supply electric current to cranes and other moving electrical machinery. It often is desirable to place two or more conductors close together in parallel relation, but in such cases the conductors generally are exposed so that accidental contact may be made with them with serious or fatal results. Also, there is a problem in rigidly supporting long conductor bars of small cross sectional area so that they will not bend between their supports. The bars are usually supplied as separate elements and must be attached to supports by means of a multitude of clamps or by members extending along the bars, to which they must be connected.

It is among the objects of this invention to provide a trolley conductor unit which can be supplied in long lengths, which includes a plurality of parallel conductor bars, which rigidly supports the bars, which insulates the bars from the the supports for the unit, which makes it unnecessary to handle the bars separately, which practically eliminates the chance of accidental contact with the bars, and which can be quickly connected end to end with like units to produce any length desired.

The preferred embodiment of the invention is illustrated in the accompanying drawings, in which FIG. 1 is a plan or back view;

FIG. 2 is a side view;

FIG. 3 is a bottom or front view;

FIG. 4 is an enlarged cross section taken on the line IV—IV of FIG. 2;

FIG. 5 is an enlarged cross section taken on the line V—V of FIG. 3;

FIG. 6 is a fragmentary longitudinal vertical section taken on the line VI—VI of FIG. 5; and FIG. 7 is a horizontal section taken on the line VII—VII of FIG. 5.

Referring to the drawings, a rigid rail 1 of any desired length, such as 10 to 20 feet, is extruded from a suitable plastic. High impact polyvinyl chloride is satisfactory. The rail preferably has a generally rectangular outline in cross section and may be tubular to reduce its weight, to provide a duct for wires, and for other purposes. This rail can be connected end to end with other like rails as shown, to form a continuous rail of any desired length.

In order to fasten the rail to a support beside it or above it, the back or top of the rail may be provided with a channel 2 extending lengthwise of it. The outer edges of the side walls of the channel have flanges 3 extending toward each other a short distance. Bolts 4 are disposed along the channel for connecting the rail to its support or supports. Each bolt has a rectangular head 5 that is narrow enough to be inserted between the channel flanges, but the head is long enough so that it then can be rotated only about 90° before its ends will strike the side walls of the channel and stop further rotation. As shown in FIG. 1, two diagonally opposite corners of the head are rounded in order to allow the head to be turned far enough to extend transversely of the channel. The bolts can be moved along the channel to any desired positions.

The channels 2 also aid in connecting the rails end to end. For this purpose a rectangular plate 7 is slid into one end of a rail channel and then the adjacent end of the next rail is moved up against the end of the first rail. The plate is moved along the two channels until it straddles the joint between the meeting ends of the rails. Another plate 8 is placed against the back of flanges 3, and screws 9 that are rotatably mounted in this plate are screwed into threaded holes in the lower plate. By tightening the screws, the flanges of the two rails can be clamped tightly between the two plates. If desired, the two plates can be connected together loosely and handled as a single unit before the inner plate is inserted in the rail channels.

The opposite side of the rail, which is the front side, is provided with parallel slots 11 extending lengthwise of it. There are at least two of these slots and usually three or more. As shown in FIG. 4, the inner sides of the slots opposite their open sides are closed by a partition wall 12 that extends across them and forms the front or lower wall of the tubular portion of the rail. The opposite side walls of each slot are provided at their inner sides beside the partition wall with a pair of opposed grooves 13 extending lengthwise of the rail. Disposed in each of the slots 11 there is a rigid electrical conductor bar 14, the edges of which extend into grooves 13 to retain the bar in place. The bar is inserted from one end of the rail. The depth of the slots is such that the exposed front surfaces of the conductor bars are spaced a considerable distance inwardly from the front face of the rail. Consequently, there is little danger of something accidentally coming in contact with the recessed conductor bars, which conduct electricity.

On the other hand, the conductor bars are properly engaged by current pick-up members that extend into the slots. These may be trolley wheels or sliding shoes supported at their outer ends in any suitable manner. For example, as shown in FIG. 4, shoes 16 may be mounted on the base 17 of a trolley that has upwardly extending side flanges 18 straddling the rail and provided with wheels 19 that travel along the opposite sides of the rail in channels 20 that form tracks for the wheels. The contact shoes are electrically connected in the trolley to conductors 21, by which current is carried away from them.

To increase the electrical leakage distance of the side walls of the slots, they are provided with a further pair of grooves 23. This increased surface area or leakage distance makes it unlikely that carbon dust from the contact shoes, which may accumulate to some extent on the slot walls, will cause trouble.

The back of the partition wall may be provided with rearwardly projecting longitudinal ribs 25 that strengthen the wall and provide insulating barriers between conductors at the location where the conductors are spliced.

To connect the conductor bars 14 of one rail with the bars in another rail aligned with it, the partition wall 12 in the first rail terminates short of the end of that rail that engages the second rail, so that the backs of slots 11 where the partition wall is missing are not closed, as shown in FIG. 6. This exposes the backs of end portions of the conductor bars in the first rail. The conductor bars in the adjoining rail have projecting end portions 27 that extend into the first rail and are offset rearwardly far enough to overlap the exposed backs of the bars therein. To secure the overlapping end portions of the bars tightly together, those in the first rail are provided with countersunk holes in which screws 28 are rotatably mounted. The heads of the screws are flush with the outer surfaces of the bars. These screws extend through openings in the offset end portions 27 of the adjoining bars and into nut members 29 behind them. By tightening the screws, the overlapping end portions of the bars are clamped tightly together. Preferably, the rail is furnished with the screws in place and in the nut members. In that case, the offset ends of the bars in the adjoining rail are provided with open end slots 30 so that they can be slid across the screws in the space between the nut members and the screw-carrying bars when the rails are moved together. The screws are then tightened to clamp the overlapping bars together. Of course, in each rail that is not to form an end rail of the system, the conductor bars carry the screws and nut members at one end and have the projecting slotted offset end portions at the opposite end.

A conductor unit constructed in accordance with this invention is relatively inexpensive because it has a minimum of parts and the bar-supporting rail can be extruded. The rail is easy to connect to like rails and also easy to connect to supports. The rail is a structural member that insulates and supports the electrical conductors without the necessity of further components. That is, the rail does not have to be mounted in a metal housing to reinforce and stiffen it, which would increase the cost considerably. The conductor bars are held firmly in place in a simple manner and are protected by the portions of the rail projecting in front of them. Also, the conductor bars in adjoining rails can quickly and easily be connected together.

Another advantage of this rigid rail of insulating material is that it permits insertion of short insulating bars at any desired locations along the length of the electrical conductor bars and of the same shape. Electric current of varying characteristics then can be delivered to the different longitudinally spaced sections of the conductor bars by wires suitably connected to them.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A multiple trolley conductor unit, comprising a rigid extrusion of insulating material in the form of a tubular rail having a front side provided with parallel slots extending lengthwise thereof for receiving current pick-up members movable lengthwise of the rail, the opposite side walls of each slot being provided at their inner sides with a pair of opposed grooves extending lengthwise thereof, the inside of the tubular rail being provided with a partition wall extending across it and the inner sides of said slots to close them, the rail also having a rib projecting rearwardly from the side of the partition wall opposite the slots and extending lengthwise of the rail in a plane between slots, and a rigid electrical conductor bar in each slot with its edges retained in the pair of grooves therein, whereby the conductor bars are spaced inwardly from the open sides of said slots, said rail being a self-sustaining structural member free of separate reinforcing and stiffening means.

2. A multiple trolley conductor unit, comprising a pair of tubular rails formed of insulating material and meeting end to end, each rail having a front side provided with parallel slots extending lengthwise thereof for receiving current pick-up members movable lengthwise of the rails, a partition wall extending across the inside of the tubular rail and closing the inner sides of the slots, the opposite side walls of each slot being provided beside said partition wall with a pair of opposed grooves extending lengthwise thereof, a rigid electrical conductor bar in each slot of each rail with its edges retained in the pair of grooves therein, whereby the bars are spaced from the open sides of the slots, and means connecting the ends of the bars in one rail to the adjoining ends of the bars in the other rail.

3. A multiple trolley conductor unit according to claim 2, in which the partition wall at the meeting end of one rail is spaced inwardly of the rail from that end to expose the backs of the adjacent end portions of said bars, the conductor bars of the other rail have projecting end portions offset rearwardly from the bars and overlapping the exposed backs of the adjoining bars, and said connecting means fasten the overlapping ends of the bars together.

* * * * *